United States Patent
Samie et al.

(10) Patent No.: US 10,508,696 B1
(45) Date of Patent: Dec. 17, 2019

(54) SELECTABLE ONE-WAY CLUTCH WITH DAMPER SPRINGS

(71) Applicant: GM Global Technology Operations LLC, Detroit, MI (US)

(72) Inventors: Farzad Samie, Franklin, MI (US);
Derek F. Lahr, Howell, MI (US);
Chunhao J. Lee, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 61 days.

(21) Appl. No.: 16/001,744

(22) Filed: Jun. 6, 2018

(51) Int. Cl.
*F16D 41/08* (2006.01)
*F16D 41/069* (2006.01)
*F16D 41/06* (2006.01)

(52) U.S. Cl.
CPC ......... *F16D 41/084* (2013.01); *F16D 41/069* (2013.01); *F16D 2041/0605* (2013.01)

(58) Field of Classification Search
None
See application file for complete search history.

(56) References Cited

U.S. PATENT DOCUMENTS

| | | | |
|---|---|---|---|
| 2010/0234166 A1* | 9/2010 | Samie | F16H 3/663 475/285 |
| 2016/0348742 A1* | 12/2016 | Yasui | F16D 41/125 |
| 2019/0128342 A1* | 5/2019 | Sturgin | F16D 41/067 |

* cited by examiner

*Primary Examiner* — Timothy Hannon
(74) *Attorney, Agent, or Firm* — Reising Ethington, P.C.

(57) ABSTRACT

A selectable one-way clutch can be equipped in a vehicle powertrain assembly. The selectable one-way clutch can include a notch plate and a pocket plate. The pocket plate has a pocket, and the notch plate has a notch. A coupling mechanism is disposed in the pocket and is moveable in the pocket. The coupling mechanism is used to bring about engagement between the notch and pocket plates and, in an example, is a strut-type coupling mechanism. A pair of damper springs is disposed in the pocket. A selector plate is situated between the pocket plate and the notch plate. The selector plate includes a window.

19 Claims, 1 Drawing Sheet

SELECTABLE ONE-WAY CLUTCH WITH DAMPER SPRINGS

INTRODUCTION

The present disclosure relates to selectable one-way clutches (SOWCs) equipped in vehicle transmissions.

In vehicle transmissions, a selectable one-way clutch is often used to effect a one-way driving connection between the respective input and output torque-transferring components. A specific example is a hybrid electric vehicle (HEV) in which a selectable one-way clutch is equipped between an internal combustion engine and a torque converter. Still, selectable one-way clutches can be installed elsewhere in a vehicle transmission, and elsewhere within other assemblies. When plates of a selectable one-way clutch are prompted to transfer torque between them, impact loads applied can oftentimes have a considerable magnitude.

SUMMARY

In an embodiment, a selectable one-way clutch may include a notch plate, a pocket plate, a coupling mechanism, a first damper spring, a second damper spring, and a selector plate. The notch plate has a notch and the pocket plate has a pocket. The coupling mechanism is movably disposed in the pocket. The coupling mechanism effects engagement between the notch plate and the pocket plate. The first damper spring is disposed in the pocket. The first damper spring exerts a first spring load to the coupling mechanism. The second damper spring is disposed in the pocket. The second damper spring exerts a second spring load to the coupling mechanism. The selector plate is situated between the pocket plate and the notch plate, and includes a window. Amid use of the selectable one-way clutch, when the coupling mechanism is used to effect engagement between the notch plate and the pocket plate, the first and second damper springs compress and expand in response to movement of the coupling mechanism within the pocket.

In an embodiment, the first damper spring exerts the first spring load to the coupling mechanism in a first circumferential direction relative to the pocket plate. The second damper spring exerts the second spring load to the coupling mechanism in a second circumferential direction relative to the pocket plate. The second circumferential direction is opposite in direction to the first circumferential direction.

In an embodiment, the first circumferential direction is generally opposite in direction to a first load applied to the coupling mechanism when the notch plate and pocket plate are being engaged. The second circumferential direction is generally opposite in direction to a second load applied to the coupling mechanism when the notch plate and pocket plate are being engaged.

In an embodiment, the coupling mechanism includes a strut housing disposed movably in the pocket. The coupling mechanism further includes a strut coupled to the strut housing. The strut can extend from the strut housing via a biasing member that biases the strut toward the notch plate.

In an embodiment, the pocket plate includes a first spring bore and includes a second spring bore. The first damper spring is received in the first spring bore, and the second damper spring is received in the second spring bore.

In an embodiment, the coupling mechanism is moveable within the pocket in a reciprocating back-and-forth manner in response to loads applied to the coupling mechanism during use of the selectable one-way clutch.

In an embodiment, the pocket plate includes a shoulder located near or in the pocket. The shoulder arrests movement of the coupling mechanism by way of abutment between the shoulder and the coupling mechanism.

In an embodiment, the first damper spring is of the helical compression spring type. Similarly, the second damper spring is of the helical compression spring type.

In an embodiment, the first spring load is a variable spring load, the second spring load is a variable spring load, or both of the first and second spring loads are variable spring loads.

In an embodiment, a vehicle powertrain assembly includes the selectable one-way clutch.

In an embodiment, a selectable one-way clutch may include a notch plate, a pocket plate, a coupling mechanism, a first damper spring, a second damper spring, and a selector plate. The notch plate has a notch. The pocket plate has a pocket, a first spring bore, and a second spring bore. The coupling mechanism is disposed in the pocket. The coupling mechanism effects engagement between the notch plate and the pocket plate. The first damper spring is received in the first spring bore. The second damper spring is received in the second spring bore. The selector plate is situated between the pocket plate and the notch plate. The selector plate includes a window. Amid use of the selectable one-way clutch, when the coupling mechanism is used to effect engagement between the notch plate and the pocket plate, the first damper spring or the second damper spring yields to a load applied at engagement.

In an embodiment, the coupling mechanism can move within the pocket. The coupling mechanism moves in response to the load being applied at engagement between the notch plate and the pocket plate.

In an embodiment, the coupling mechanism includes strut housing and a strut. The strut can extend from the strut housing.

In an embodiment, the first damper spring exerts a first spring load to the coupling mechanism in a first circumferential direction relative to the pocket plate. The second damper spring exerts a second spring load to the coupling mechanism in a second circumferential direction relative to the pocket plate. The second circumferential direction is opposite in direction to the first circumferential direction.

In an embodiment, the first spring bore is open to the pocket. The second spring bore is likewise open to the pocket.

In an embodiment, the first damper spring is of the helical compression spring type. Similarly, the second damper spring is of the helical compression spring type.

In an embodiment, the first spring load is a variable spring load, the second spring load is a variable spring load, or both of the first and second spring loads are variable spring loads.

In an embodiment, a selectable one-way clutch may include a notch plate, a pocket plate, a strut housing, a strut, a first damper spring, a second damper spring, and a selector plate. The notch plate has a notch. The pocket plate has a pocket, a first spring bore, and a second spring bore. The strut housing is disposed in the pocket and can be moved in the pocket. The strut is supported in the strut housing and can be extended from the strut housing by way of a biasing member. The first damper spring is received in the first spring bore. The first damper spring exerts a first spring load to the strut housing. The second damper spring is received in the second spring bore. The second damper spring exerts a second spring load to the strut housing. The selector plate is situated between the pocket plate and the notch plate. The selector plate has a window. Amid use of the selectable one-way clutch, when the window is generally in-line with the notch and with the strut housing, the strut extends from the strut housing and extends through the window and is received in the notch. And, when the strut is received in the notch, an initial load applied to the strut causes compression of the first damper spring and concomitant movement of the strut housing.

In an embodiment, the first damper spring is of the helical compression spring type, and likewise the second damper spring is of the helical compression spring type.

In an embodiment, a vehicle powertrain assembly includes the selectable one-way clutch.

BRIEF DESCRIPTION OF THE DRAWINGS

One or more aspects of the disclosure will hereinafter be described in conjunction with the appended drawings, wherein like designations denote like elements, and wherein.

DETAILED DESCRIPTION

Figure 1:
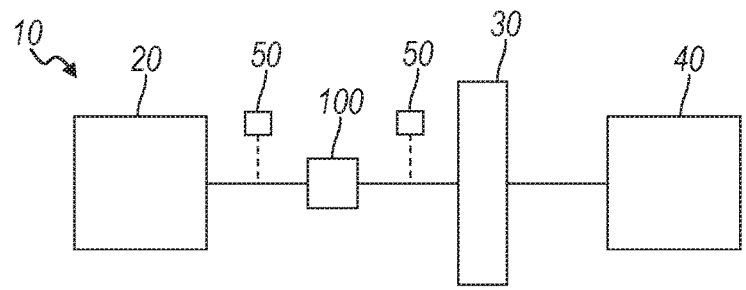
FIG. 1 is a schematic view of an example vehicle powertrain assembly that can include an embodiment of a selectable one-way clutch.

Referring to the drawings, a selectable one-way clutch (SOWC) is provided for use with a vehicle powertrain assembly, such as an automotive powertrain assembly of a larger hybrid electric vehicle (HEV). The selectable one-way clutch furnishes damping and hence reduces impact loads borne by the selectable one-way clutch when plates of the selectable one-way clutch are prompted to synchronize and to transfer torque between them. In this way, durability of the selectable one-way clutch is enhanced. Moreover, one or more dampers that might otherwise be installed in and around a previously-known selectable one-way clutch—such as upstream the selectable one-way clutch—may be unnecessary and could be omitted in embodiments detailed in this description and depicted in the figures. Furthermore, although the selectable one-way clutch presented in the figures and described herein is a strut-type clutch, the selectable one-way clutch could be of other clutch types in other embodiments including, but not limited to, a pawl-type clutch. The selectable one-way clutch is described below in the context of an automotive application, yet could be equipped in non-automotive applications as well.

With reference to FIG. 1, a vehicle powertrain assembly 10 can have various designs, constructions, and components depending on its particular architecture and the larger vehicle in which the assembly is equipped. In the example presented, the vehicle powertrain assembly 10 includes an engine 20, a torque converter 30, and a transmission 40—these components are not uncommon in one form or another in powertrain assemblies in hybrid electric automotive vehicles, as well as other vehicle types. The engine 20 can be an internal combustion engine. The torque converter 30 delivers torque from the engine 20 and to the vehicle transmission 40. As depicted in the example of FIG. 1, a selectable one-way clutch 100 can be installed between the engine 20 and the torque converter 30; still, in other examples the selectable one-way clutch 100 can have other locations of installation and can be situated between other components. For example, the selectable one-way clutch 100 could be installed within the vehicle transmission 40. In the location of FIG. 1, and when prompted, the selectable one-way clutch 100 operates to transfer torque from the engine 20 and downstream to the torque converter 30. Further, as depicted in FIG. 1, a flexplate 50 can be equipped between the engine 20 and the selectable one-way clutch 100, or can be equipped between the selectable one-way clutch 100 and the torque converter 30.

Figure 2:
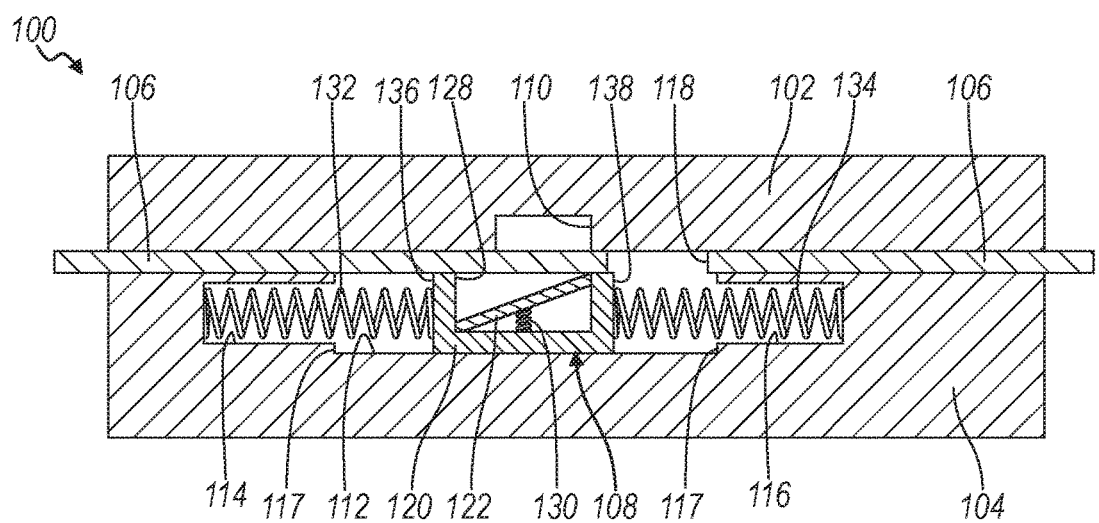
FIG. 2 is an enlarged and segmented sectional view of an embodiment of the selectable one-way clutch, the selectable one-way clutch being in a first state of operation.
Figure 3:
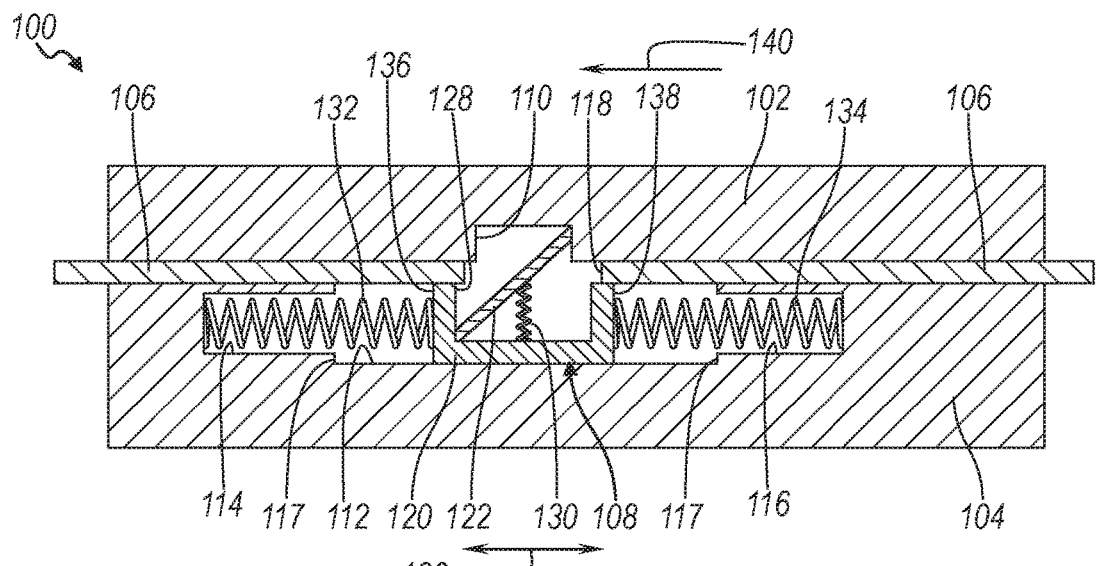
FIG. 3 is an enlarged and segmented sectional view of the selectable one-way clutch of FIG. 2, the selectable one-way clutch being in a second state of operation.

The selectable one-way clutch 100 can have different designs, constructions, and components in different embodiments depending upon, among other possible influences, the design and construction of the upstream and downstream components between which the selectable one-way clutch 100 transfers torque. In the embodiment of FIGS. 2 and 3, the selectable one-way clutch 100 includes a notch plate 102, a pocket plate 104, a selector plate 106, and a coupling mechanism 108. The notch plate 102 and pocket plate 104, as well as possibly other components of the selectable one-way clutch 100, are generally circular in shape and thus the terms radially, circumferentially, and axially, and their related forms, are used with reference to the circular shape. The notch plate 102 receives rotational drive input from a crankshaft of the engine 20. The notch plate 102 defines multiple notches 110 in its body that are each meant to receive a component of the coupling mechanism 108, as described more below. Only a single notch 110 is shown in FIGS. 2 and 3 for descriptive purposes, but it should be appreciated that the multiple notches 110 of the notch plate 102 can be distributed around the circumference of the notch plate 102. The pocket plate 104—when the selectable one-way clutch 100 operates to transfer toque—transmits rotational drive output to the torque converter 30. Indeed, in some embodiments, the pocket plate 104 is an integrated component of a pump of the torque converter 30. The pocket plate 104 defines multiple pockets 112 in its body that can each receive a single coupling mechanism 108. As before, only a single pocket 112 is shown in FIGS. 2 and 3 for descriptive purposes, but it should be appreciated that the multiple pockets 112 of the pocket plate 104 can be distributed around the circumference of the pocket plate 104. In order to accommodate damper spring components of the coupling mechanism 108, the pocket plate 104 can additionally define bores in its body. In the embodiment of FIGS. 2 and 3, a first spring bore 114 lies adjacent the pocket 112 and is open to and communicates with the pocket 112. Similarly, a second spring bore 116 lies adjacent the pocket 112 and is open to and communicates with the pocket 112. Still, in other embodiments, the pocket plate 104 could define other voids for accommodating components of the coupling mechanism 108, or need not define any additional voids beyond the pocket 112 for accommodation purposes. To cease and arrest movement of the coupling mechanism 108 during use of the selectable one-way clutch 100, one or more shoulders 117 can be located in the pocket 112 and near the first and/or second spring bores 114, 116. The shoulder(s) 117 can be an extended step as depicted in FIGS. 2 and 3, or can have another form. Abutment between the shoulder(s) 117 and the coupling mechanism 108 blocks farther movement of the coupling mechanism 108.

In assembly, the selector plate 106 is situated and sandwiched between the notch plate 102 and the pocket plate 104 and can move therebetween among the different modes of operation of the selectable one-way clutch 100. Like the notch and pocket plates 102, 104, the selector plate 106 can be generally circular in shape. The selector plate 106 defines multiple windows 118 in its body that are sized to accept passage of a component of the coupling mechanism 108 therethrough, as described more below. Only a single window 118 is shown for descriptive purposes, but it should be appreciated that the multiple windows 118 of the selector plate 106 can be distributed around the circumference of the selector plate 106.

The coupling mechanism 108 is used to synchronize rotational speeds of the notch plate 102 and pocket plate 104 and to assist the transfer of torque between the notch and pocket plates 102, 104. Moreover, the coupling mechanism 108 furnishes a damping functionality amid these actions, and hence reduces the applied impact loads that are endured by the selectable one-way clutch 100. As a result of this reduction, durability of the selectable one-way clutch 100 is enhanced. The coupling mechanism 108 can have various designs, constructions, and components in different embodiments depending upon—among other potential factors—the designs and constructions and components of the notch plate 102 and pocket plate 104, and the expected magnitudes of the impact loads applied during use of the selectable one-way clutch 100. In the embodiment of FIGS. 2 and 3, the coupling mechanism 108 includes a strut carrier or housing 120, a strut 122, a first damper spring 132, and a second damper spring 134. FIGS. 2 and 3 show a single coupling mechanism 108 for descriptive purposes, but it should be appreciated that multiple coupling mechanism 108 can be present in the selectable one-way clutch 100.

The strut housing 120 is disposed in the pocket 112 in a way that permits the strut housing 120 to move within the pocket 112 in response to the impact loads applied when the notch and pocket plates 102, 104 are situated to transfer torque. The movement experienced by the strut housing 120 can be reciprocal back-and-forth sliding movement, such as that represented by an arrow 126 in FIG. 3; still, the movement can have other behaviors in other embodiments. Whatever the behavior, the movement can be short-lived for the time period that impact load is applied when the notch and pocket plates 102, 104 are initially engaged with each other when transferring torque. That is, the movement may settle post-engagement. In the embodiment presented by FIGS. 2 and 3, the strut housing 120 has an opening 128 through which the strut 122 extends. The strut 122 is supported in the strut housing 120 and is partly extendable out of the strut housing 120 amid use. In FIGS. 2 and 3, the strut 122 is coupled to the strut housing 120 via a biasing member 130, such as a coil spring or other type of spring, but this coupling could be carried out in other ways. In the example of the figures, the biasing member 130 biases extension of the strut 122 toward the notch plate 102 and away from the pocket plate 104. Because of this biasing, when the opening 128, window 118, and notch 110 are in general alignment and in-line with one another as illustrated in FIG. 3, the strut 122 extends through the opening 128 and through the window 118 and is received in the notch 110. FIG. 3 depicts a mode of operation of the selectable one-way clutch 100 in which the notch and pocket plates 102, 104 are engaged and the notch and pocket plates 102, 104 rotate in unison in a first rotational direction (while not precisely illustrated as such, skilled artisans will appreciate that, in the mode of operation of FIG. 3, the first damper spring 132 would be in a compressed state and the second damper spring 134 would be in an extended state). Although not specifically shown, skilled artisans will appreciate that the notch and pocket plates 102, 104 can also rotate in unison in a second rotational direction which is opposite the first rotational direction. Conversely, FIG. 2 depicts a mode of operation of the selectable one-way clutch 100 in which the notch and pocket plates 102, 104 are disengaged, allowing the pocket plate 104 to freewheel and rotate independently of the notch plate 102. Here, the strut 122 is retracted within the strut housing 120, with the selector plate 106 precluding reception of the strut 122 in the notch 110. This mode of operation can be employed when the engine 20 is in an off state.

The first and second damper springs 132, 134 are disposed in the pocket 112 and exert a spring load to the coupling mechanism 108 and, in this embodiment, to the strut housing 120. In the embodiment of FIGS. 2 and 3, the first damper spring 132 is seated and received in the first spring bore 114, and the second damper spring 134 is likewise seated and received in the second spring bore 116. By this location, the first damper spring 132 exerts a first spring load to a first side 136 of the strut housing 120, and the second damper spring 134 exerts a second spring load to a second side 138 of the strut housing 120. Although shown as direct and immediate, the exerted spring loads to the strut housing 120 could involve intervening components and/or structures between the dampers springs 132, 134 and the strut housing 120 in other embodiments. The exerted spring loads, in this embodiment, are directed parallel to the direction of movement of the strut housing 120, as represented by arrow 126 in FIG. 3. The exerted spring loads are also directed somewhat circumferentially relative to the circular shape of the pocket plate 104. In terms of magnitude, the spring loads exerted by the first and second damper springs 132, 134 can have various exertion amounts in different embodiments. In an example, the first and second damper springs 132, 134 can possess a spring rate that is greater than the expected magnitudes of the impact loads applied during use of the selectable one-way clutch 100. Furthermore, the first and second damper springs 132, 134 can be of various spring types in different embodiments. In one example, the first and second damper springs 132, 134 are of the helical compression spring type. And in another example, the first and second damper springs 132, 134 exert a variable spring load; here, the spring rate can be weaker at initial compression and can have greater strength at subsequent compressions.

When the notch and pocket plates 102, 104 are initially engaged with each other, the impact loads experienced at the time of engagement can be considerable, especially when the rotational speed differential between the notch and pocket plates 102, 104 is high. Over time, the impact loads can impart wear to the selectable one-way clutch 100. The damping functionality introduced by the coupling mechanism 108, as well as the lower mass and inertia of the strut housing 120 compared to the plates, are meant to resolve these shortcomings. With reference to FIG. 3, upon initial receipt of the strut 122 in the notch 110, an impact load 140 is applied to the strut 122 and ultimately to the strut housing 120. The strut housing 120, in turn, is moved in the pocket 112 in the same direction as that of the applied impact load 140. The first damper spring 132 yields to the applied impact load 140 and compresses in length in response thereto. The second damper spring 134 can concurrently and concomitantly expand in length. The impact load 140 is hence damped by the coupling mechanism 108. These actions also occur in the opposite rotational direction, but with the second damper spring 134 yielding and compressing.

It is to be understood that the foregoing is a description of one or more aspects of the disclosure. The disclosure is not limited to the particular embodiment(s) disclosed herein, but rather is defined solely by the claims below. Furthermore, the statements contained in the foregoing description relate to particular embodiments and are not to be construed as limitations on the scope of the disclosure or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A selectable one-way clutch, comprising:
   a notch plate and a pocket plate, the notch plate having a notch and the pocket plate having a pocket;
   a coupling mechanism movably disposed in the pocket, the coupling mechanism effecting engagement between the notch plate and the pocket plate;
   a first damper spring disposed in the pocket and exerting a first spring load to the coupling mechanism, and a second damper spring disposed in the pocket and exerting a second spring load to the coupling mechanism; and
   a selector plate situated between the notch plate and the pocket plate, the selector plate including a window;
   wherein, during use of the selectable one-way clutch, when the coupling mechanism is used to effect engagement between the notch plate and the pocket plate, the first and second damper springs compress and expand in response to movement of the coupling mechanism within the pocket.

2. The selectable one-way clutch of claim 1, wherein the first damper spring exerts the first spring load to the coupling mechanism in a first circumferential direction relative to the pocket plate, and the second damper spring exerts the second spring load to the coupling mechanism in a second circumferential direction relative to the pocket plate, the second circumferential direction being opposite to the first circumferential direction.

3. The selectable one-way clutch of claim 2, wherein the first circumferential direction is generally opposite in direction to a first load applied to the coupling mechanism when the notch plate and pocket plate are being engaged, and the second circumferential direction is generally opposite in direction to a second load applied to the coupling mechanism when the notch plate and pocket plate are being engaged.

4. The selectable one-way clutch of claim 1, wherein the coupling mechanism includes a strut housing disposed movably in the pocket, and includes a strut coupled to the strut housing and extendable from the strut housing via a biasing member that biases the strut toward the notch plate.

5. The selectable one-way clutch of claim 1, wherein the pocket plate includes a first spring bore and a second spring bore, the first damper spring being received in the first spring bore and the second damper spring being received in the second spring bore.

6. The selectable one-way clutch of claim 1, wherein the coupling mechanism is moveable reciprocatively within the pocket in response to loads applied to the coupling mechanism during use of the selectable one-way clutch.

7. The selectable one-way clutch of claim 1, wherein the pocket plate includes a shoulder adjacent the pocket, the shoulder arresting movement of the coupling mechanism via abutment between the shoulder and the coupling mechanism.

8. The selectable one-way clutch of claim 1, wherein the first damper spring is of the helical compression spring type, and the second damper spring is of the helical compression spring type.

9. The selectable one-way clutch of claim 1, wherein the first spring load is a variable spring load, the second spring load is a variable spring load, or both of the first and second spring loads are variable spring loads.

10. A vehicle powertrain assembly comprising the selectable one-way clutch of claim 1.

11. A selectable one-way clutch, comprising:
    a notch plate and a pocket plate, the notch plate having a notch, and the pocket plate having a pocket, a first spring bore, and a second spring bore;
    a coupling mechanism disposed in the pocket, the coupling mechanism effecting engagement between the notch plate and the pocket plate, the coupling mechanism including a strut housing and a strut, the strut being extendable from the strut housing;
    a first damper spring received in the first spring bore;
    a second damper spring received in the second spring bore; and
    a selector plate situated between the notch plate and the pocket plate, the selector plate including a window;
    wherein, during use of the selectable one-way clutch, when the coupling mechanism is used to effect engagement between the notch plate and the pocket plate, the first damper spring or the second damper spring yields to a load applied at engagement.

12. The selectable one-way clutch of claim 11, wherein the coupling mechanism is moveable within the pocket and moves in response to the load being applied at engagement between the notch plate and the pocket plate.

13. The selectable one-way clutch of claim 11, wherein the first damper spring exerts a first spring load to the coupling mechanism in a first circumferential direction relative to the pocket plate, and the second damper spring exerts a second spring load to the coupling mechanism in a second circumferential direction relative to the pocket plate, the second circumferential direction being opposite to the first circumferential direction.

14. The selectable one-way clutch of claim 11, wherein the first spring bore is open to the pocket, and the second spring bore is open to the pocket.

15. The selectable one-way clutch of claim 11, wherein the first damper spring is of the helical compression spring type, and the second damper spring is of the helical compression spring type.

16. The selectable one-way clutch of claim 11, wherein the first spring load is a variable spring load, the second spring load is a variable spring load, or both of the first and second spring loads are variable spring loads.

17. A selectable one-way clutch, comprising:
    a notch plate having a notch;
    a pocket plate having a pocket, a first spring bore, and a second spring bore;
    a strut housing disposed in the pocket and being moveable in the pocket;
    a strut supported in the strut housing and extendable from the strut housing via a biasing member;
    a first damper spring received in the first spring bore and exerting a first spring load to the strut housing;

a second damper spring received in the second spring bore and exerting a second spring load to the strut housing; and a selector plate situated between the notch plate and the pocket plate, the selector plate having a window;

wherein, during use of the selectable one-way clutch, when the window is generally in-line with the notch and with the strut housing, the strut extends from the strut housing and through the window and is received in the notch; and wherein, when the strut is received in the notch, a load applied to the strut causes compression of the first damper spring and concomitant movement of the strut housing.

18. The selectable one-way clutch of claim 17, wherein the first damper spring is of the helical compression spring type, and the second damper spring is of the helical compression spring type.

19. A vehicle powertrain assembly comprising the selectable one-way clutch of claim 17.

\* \* \* \* \*